(12) United States Patent
Shi et al.

(10) Patent No.: US 10,708,363 B2
(45) Date of Patent: Jul. 7, 2020

(54) ARTIFICIAL INTELLIGENCE BASED HIERARCHICAL SERVICE AWARENESS ENGINE

(71) Applicant: Futurewei Technologies, Inc., Plano, TX (US)

(72) Inventors: Hang Shi, Fremont, CA (US); Yinghua Ye, Los Gatos, CA (US)

(73) Assignee: Futurewei Technologies, Inc., Plano, TX (US)

(*) Notice: Subject to any disclaimer, the term of this patent is extended or adjusted under 35 U.S.C. 154(b) by 144 days.

(21) Appl. No.: 16/101,092

(22) Filed: Aug. 10, 2018

(65) Prior Publication Data

US 2020/0053155 A1 Feb. 13, 2020

(51) Int. Cl.
| | |
|---|---|
| *H04L 29/08* | (2006.01) |
| *G06K 9/62* | (2006.01) |
| *G06N 5/04* | (2006.01) |
| *G06N 20/00* | (2019.01) |

(52) U.S. Cl.
CPC ............ *H04L 67/12* (2013.01); *G06K 9/6256* (2013.01); *G06N 5/046* (2013.01); *G06N 20/00* (2019.01)

(58) Field of Classification Search
CPC .... G06K 9/62; G06K 9/00986; G06K 9/6256; G06N 20/00; G06N 3/02; G06N 5/04; G06N 5/046; G04L 67/12
See application file for complete search history.

(56) References Cited

U.S. PATENT DOCUMENTS 7,644,052 B1* 1/2010 Chang .................. G06N 5/022
706/45
8,587,402 B2* 11/2013 O'Shaughnessy ..........................
H04M 1/72569
340/286.02

(Continued)

FOREIGN PATENT DOCUMENTS

| CN | 106454900 A | 2/2017 |
| CN | 107463997 A | 12/2017 |
| CN | 107682189 A | 2/2018 |

OTHER PUBLICATIONS

"International Application No. PCT/CN2019/098330, International Search Report and Written Opinion dated Oct. 29, 2019", (Oct. 29, 2019), 10 pgs.

*Primary Examiner* — Sargon N Nano

(74) *Attorney, Agent, or Firm* — Schwegman Lundberg & Woessner, P.A.

(57) ABSTRACT

Systems and methods are provided for recognition of an application in communication traffic flow in a network using an artificial intelligence (AI) based hierarchical service awareness engine. A decode equivalent class (DEC) can be used to provide information on the application. A DEC corresponds to a class of traffic that is mapped to an artificial intelligence (AI) model associated with parameters related to the class of traffic. DEC information can be fed to an AI model set and an inference model can be derived from a AI model of the AI model set corresponding to a DEC. The inference model can be provided to a gateway of the network to recognize a specific application of a service in communication flows. In various embodiments, in training the AI models, the gateway can provide DEC information for the AI model set from classifying flows of data traffic received from the network into DECs.

20 Claims, 8 Drawing Sheets

(56) References Cited

U.S. PATENT DOCUMENTS

| | | | |
|---|---|---|---|
| 8,700,620 B1* | 4/2014 | Lieberman | G06F 16/36 |
| | | | 707/728 |
| 9,053,431 B1* | 6/2015 | Commons | G06N 3/02 |
| 2002/0032591 A1* | 3/2002 | Mahaffy | H04M 3/493 |
| | | | 709/202 |
| 2008/0010229 A1* | 1/2008 | Lee Shu Tak | G06F 8/20 |
| | | | 706/14 |
| 2010/0049677 A1* | 2/2010 | Jaros | G06N 3/04 |
| | | | 706/12 |
| 2014/0324395 A1* | 10/2014 | Silverman | G06F 5/04 |
| | | | 703/1 |
| 2017/0180515 A1* | 6/2017 | Edwards | G06N 3/04 |
| 2018/0089437 A1* | 3/2018 | Baset | G06F 21/577 |
| 2018/0182185 A1* | 6/2018 | Tong | G06N 5/022 |
| 2018/0260691 A1* | 9/2018 | Nagaraja | G06N 3/063 |
| 2020/0050481 A1* | 2/2020 | Ouyang | G06F 9/3877 |

* cited by examiner

US 10,708,363 B2

ARTIFICIAL INTELLIGENCE BASED HIERARCHICAL SERVICE AWARENESS ENGINE

FIELD OF THE INVENTION

The present disclosure is related to data communications and, in particular, service awareness in data communications.

BACKGROUND

The number of mobile applications for mobile devices is exponentially increasing. At the same time, service operators desire a network to be able to recognize what the service operators consider to be important applications to provide different service treatments with respect to these applications. For example, some operators may offer packaged services, which may include free data usages for particular applications. For this type of provisioning, operators may look to the network to be able to detect a specific application in less than ten packets for billing purposes, for example.

Some application providers have numerous applications. Google™, for example, hosts many applications, such as Gmail™, Google Drive™, Youtube™, Google Map™, Google Hangout™ etc. These applications can share common content delivery network (CDN) servers. With this sharing, recognizing one application, such as the Google map application, in near real time becomes challenging. In addition, encryption of traffic is increasing. It has been predicted that by 2019, 80% of network traffic will be encrypted. With the deployment of the newest versions of transport layer security (TLS), which is an encryption protocol that provides communications security over a network, and the deployment of quick UDP (User Datagram Protocol) internet connections (QUIC), which is a transport layer network protocol, accurately recognizing an application becomes more difficult.

SUMMARY

Systems and methods are provided for recognition of an application in communication traffic flow in a network using an artificial intelligence (AI) based hierarchical service awareness engine. In a hierarchical service awareness engine, decode equivalent classes (DECs) that correspond to AI models and parameters can be used in the recognition of the applications in data flows. DEC Information can be provided to train AI models from which inference models are generated. The inference models can be used by gateways in the network to recognize applications in the data flow in the gateways, allowing operators at the gateways a mechanism to apply a service treatment to the communication flow associated with the recognized application. Results from using DECs in the gateways in the network can be used to further train the AI models, which AI models, in turn, provide the interference models and updates to the inference models to the gateways.

According to one aspect of the present disclosure, there is provided a system, the system comprising: a memory storage comprising instructions; and one or more processors in communication with the memory storage, wherein the one or more processors execute the instructions to: obtain decode equivalent class (DEC) information from data traffic received from a network; feed portions of the received data traffic to an artificial intelligence (AI) model set based on results from the obtainment of the DEC information, each portion associated with an AI model of the AI model set; derive, using each AI model of the AI model set, an inference model corresponding to the DEC associated with each AI model, the inference model recognizing a service and a specific application of the service; and handle deployment of one or more inference models to one or more user plane function (UPF) gateways.

Optionally, in any of the preceding aspects, another implementation of the aspect provides that the one or more processors execute instructions to trigger deployment of an inference model update to the one or more UPF gateways upon generation of the inference model updates.

Optionally, in any of the preceding aspects, a further implementation of the aspect provides that the one or more processors execute instructions to receive UPF gateway information from a newly added UPF gateway.

Optionally, in any of the preceding aspects, a further implementation of the aspect provides that the received UPF gateway information includes communication manner information for the newly added UPF gateway.

Optionally, in any of the preceding aspects, a further implementation of the aspect provides that the instructions are executable by the one or more processors to perform operations as a DEC controller, managing multiple UPF gateways and the AI model set.

Optionally, in any of the preceding aspects, a further implementation of the aspect provides that the operations as a DEC controller include operations to: acquire inputs on an application of interest and inputs for an AI model associated with the application of interest; create the AI model in the system corresponding to parameters associated with the application of interest for inclusion in the AI model set; and install rules at the one or more UPF gateways to include the application of interest for DEC classification at the one or more UPF gateways.

Optionally, in any of the preceding aspects, a further implementation of the aspect provides that the operations as a DEC controller include operations to create or delete inference models in a UPF gateway.

Optionally, in any of the preceding aspects, a further implementation of the aspect provides that the obtainment of the DEC information includes reading a packet header to extract the DEC information or using machine learning to deduce the DEC information.

Optionally, in any of the preceding aspects, a further implementation of the aspect provides that the obtainment of the DEC information includes reading a packet having the DEC listed in a hypertext transfer protocol (HTTP) custom header.

According to one aspect of the present disclosure, there is provided a gateway, the gateway comprising: a memory storage comprising instructions; and one or more processors in communication with the memory storage, wherein the one or more processors execute the instructions to: classify flows of data traffic received from a network into decode equivalent class (DECs); selectively direct the flows to artificial intelligence (AI) models in a system exterior to the gateway, based on the classification of the flows; send the flows to an inference models set in the gateway, based on the classification of the flows, along with DEC information corresponding to each inference model of the inference models set, each inference model recognizing a service and a specific application of the service; and manage each inference model of the inference models set in response to receiving an update for each inference model.

Optionally, in any of the preceding aspects, another implementation of the aspect provides that the one or more processors classify the flows of data traffic based on information in a stored policy that specifies types of applications to classify.

Optionally, in any of the preceding aspects, a further implementation of the aspect provides that the one or more processors classify flows of data into DECs based on domain name system messages via regular expression checkup.

Optionally, in any of the preceding aspects, a further implementation of the aspect provides that the one or more processors selectively direct the flows to the AI models by sending a part of the flows to the AI models.

Optionally, in any of the preceding aspects, a further implementation of the aspect provides that the flows to the AI models include a packet header for an individual flow having DEC information associated with the individual flow or a hypertext transfer protocol (HTTP) custom header for an individual flow having the DEC corresponding to the individual flow.

According to one aspect of the present disclosure, there is provided a computer-implemented method for operating a system to recognize an application in network data flows, the computer-implemented method comprising: obtaining, with one or more processors, decode equivalent class (DEC) information from data traffic received from a network; feeding, with the one or more processors, portions of the received data traffic to an artificial intelligence (AI) model set based on results from the obtainment of the DEC information, each portion associated with an AI model of the AI model set; deriving, using each AI model of the AI model set, an inference model corresponding to the DEC associated with each AI model, the inference model recognizing a service and a specific application of the service; and handling, with the one or more processors, deployment of one or more inference models to one or more user plane function (UPF) gateways.

Optionally, in any of the preceding aspects, another implementation of the aspect provides that the computer-implemented method includes triggering deployment of an inference model update to the one or more UPF gateways upon generation of the inference model update.

Optionally, in any of the preceding aspects, a further implementation of the aspect provides that the computer-implemented method includes receiving UPF gateway information from a newly added UPF gateway.

Optionally, in any of the preceding aspects, a further implementation of the aspect provides that the computer-implemented method includes performing operations as a DEC controller to manage multiple UPF gateways and the AI model set.

Optionally, in any of the preceding aspects, a further implementation of the aspect provides that performing the operations as the DEC controller include: acquiring inputs on an application of interest and inputs for an AI model associated with the application of interest; creating the AI model in the system corresponding to parameters associated with the application of interest for inclusion in the AI model set; and installing rules at the one or more UPF gateways to include the application of interest for DEC classification at the one or more UPF gateways.

Optionally, in any of the preceding aspects, a further implementation of the aspect provides that performing the operations as the DEC controller includes creating or deleting inference models in a UPF gateway.

Any one of the foregoing examples may be combined with any one or more of the other foregoing examples to create a new embodiment within the scope of the present disclosure.

DETAILED DESCRIPTION

Figure 1:
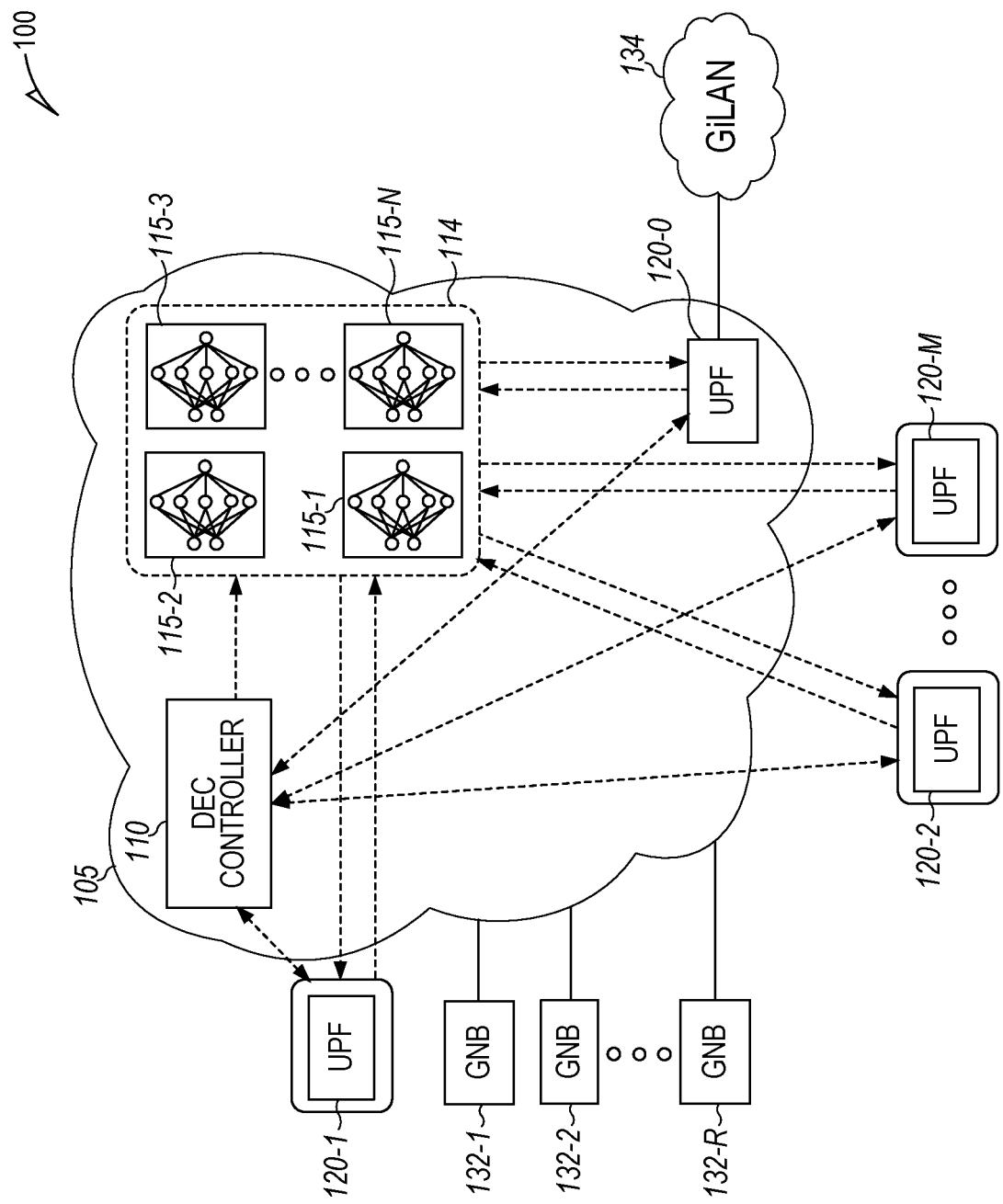
FIG. 1 illustrates an example of a high level architecture of an artificial intelligence based hierarchical service awareness engine, according to an example embodiment.

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized, and that structural, logical and electrical changes may be made. The following description of example embodiments is, therefore, not to be taken in a limited sense.

The functions or algorithms described herein may be implemented in software in an embodiment. The software may comprise computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Computer-readable non-transitory media includes all types of computer readable media, including magnetic storage media, optical storage media, and solid state storage media and specifically excludes signals. It should be understood that the software can be installed in and sold with the devices that handle event streams as taught herein. Alternatively, the software can be obtained and loaded into such devices, including obtaining the software via a disc medium or from any manner of network or distribution system, including, for example, from a server owned by the software creator or from a server not owned but used by the software creator. The software can be stored on a server for distribution over the Internet, for example.

In various embodiments, an AI based hierarchical service awareness (SA) engine can be implemented to improve SA accuracy, achieve short inference time to recognize services, and enable real time deployment in next generation mobile networks. AI is machine intelligence that includes a number of sub-fields including machine learning and various forms of neural networks. AI effectively includes the simulation of human intelligence processes by machines, where such processes include learning, which is the acquisition of information and rules for using the information, reasoning which is using the rules to reach approximate or definite conclusions, and self-correction. Service awareness is the recognition of the kind of service that is carried in a traffic flow being processed. A service awareness engine is a mechanism that enables service awareness. A framework is provided that categorizes applications into decoder equivalent classes (DECs). A DEC corresponds to a class of traffic that is mapped to an AI model associated with parameters related to the class of traffic. With each individual DEC having an AI model assigned to it with associated parameters for the individual DEC, AI model simplification can be achieved for each DEC in comparison to a single AI model for all corresponding classes of traffic. Implementation of an AI model for each individual DEC can reduce both training and inference time, along with achieving high accuracy. The framework may include cloud-based training of AI models, centralized model repository, and a per gateway (GW) deployment to enable fast response time and meet mobile core network needs.

FIG. 1 illustrates an embodiment of an example of a high level architecture of an AI based hierarchical SA engine. In this figure, the hierarchical SA engine based architecture is for a fifth generation wireless (5G) network 100. The 5G network 100 can include a cloud 105 operatively in communication with a number of next generation Node Bs (gNBs) 132-1, 132-2 . . . 132-R and a number of gateways 120-0, 120-1, 120-2 . . . 120-M. A Node B is a term to denote a base station in universal mobile telecommunications system (UMTS) terminology. The Node B is responsible for the radio link between a mobile user and a fixed part of the network. In 5G terminology, a gateway can be referred to as a UPF, which is short for a user plane function (UPF) gateway. A user plane function supports features and capabilities to facilitate user plane operation such as packet routing and forwarding, packet inspection, QoS handling, policy enforcement, data buffering, and interconnection to a data network, among other features. UPF 120-0 can be disposed as part of cloud 105 and can be coupled to a GiLAN, which is an operator host of services.

An AI based hierarchical SA engine can comprise AI training models 115-1, 115-2, 115-3 . . . 115-N with associated parameters and inference (IF) models. The AI training models with associated parameters can be deployed at a cloud 105 or other centralized location and IF models can be deployed at gateways 120-0, 120-1, 120-2 . . . 120-M. In a 5G network, UPFs can be deployed in mobile core networks or in multi-access edge computing (MEC) environments. MEC is an approach to a network architecture to enable cloud computing capabilities and an information technology (IT) service environment at the edge of a network, such as but not limited to a cellular network. MEC may be implemented to run applications and perform related processing tasks closer to the network customer, which should result in reduction to network congestion and enhanced application performance. MEC technology can be implemented at cellular base stations or other edge nodes and enables flexible and rapid deployment of new applications and services for customers. Combining elements of information technology and telecommunications networking, MEC also allows cellular operators to open their radio access network (RAN) to authorized third-parties, such as application developers and content providers.

The hierarchical SA engine, as taught herein, operates based on DECs. Applications of interest can be classified into different DECs based on their characteristics. Applications from each DEC can be classified via an AI model plus parameters for the AI model. The output of the AI model can be a final classified application that can be used in gateways, but can be further trained for updating. Multiple AI models 115-1, 115-2, 115-3 . . . 115-N, which can be part of the SA engine, can be used to provide IF models to UPFs 120-0, 120-1, 120-2 . . . 120-M, where the IF models can be updated from AI models 115-1, 115-2, 115-3 . . . 115-N that are continuing to be trained. At UPFs 120-0, 120-1, 120-2 . . . 120-M, IF models can be used to recognize applications in live traffic to allow operators to provide service treatments with respect to the recognize applications in the live traffic. UPFs 120-0, 120-1, 120-2 . . . 120-M can provide real time application data for the continuing training of the AI models 115-1, 115-2, 115-3 . . . 115-N. A DEC controller 110 can be implemented to manage multiple UPFs 120-0, 120-1, 120-2 . . . 120-M and multiple AI models 115-1, 115-2, 115-3 . . . 115-N at least with respect DEC operations.

Figure 2:
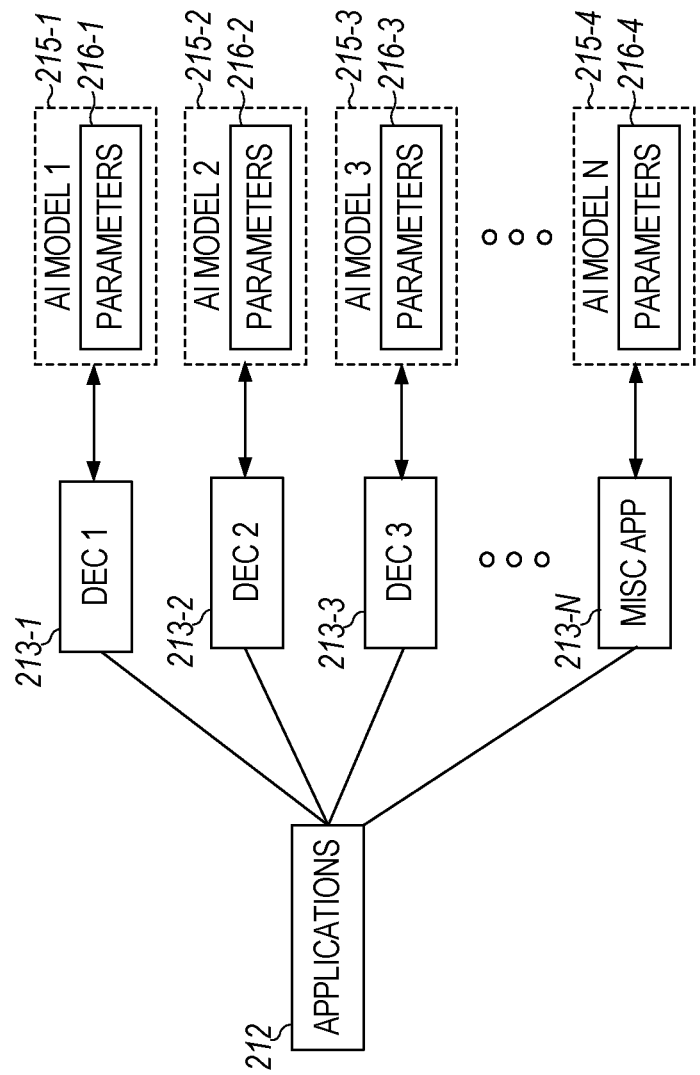
FIG. 2 illustrates an example of a decode equivalent class based classification framework, according to an example embodiment.

FIG. 2 illustrates an embodiment of an example of a DEC based classification framework. A number of applications 212 can be classified into a number of separate DECs 213-1, 213-2, 213-3 . . . 213-N. DEC 213-1 can be correlated to AI model 215-1 plus parameters 216-1. DEC 213-2 can be correlated to AI model 215-2 plus parameters 216-2. DEC 213-3 can be correlated to AI model 215-3 plus parameters 216-3. DEC 213-N can be correlated to AI model 215-N plus parameters 216-N. Each of the DECs can correspond to different sources of applications. For example, DEC(1) 213-1 can be assigned to applications from Google™. DEC(2) 213-2 can be assigned to applications from Facebook™. DEC(3) 213-3 can be assigned to applications for transport layer security (TLS). DECs 213-N can be assigned to miscellaneous applications. All applications from a source can be part of one DEC. For example, all Google applications can be assigned to one DEC.

In some instances, two or more DECs may share the same model, but their parameters can be different. A parameter is characteristic used to define or classify a particular application in an AI model. The parameters can include a hyperparameter. A hyperparameter is a parameter, whose value is set before the training, which is a learning process, of a particular AI model begins Values of other parameters for the particular AI model are derived via training, that is, given these hyperparameters, the training process learns additional parameters or modifies parameters from data input to the particular AI model. This structure provides a hierarchical structure in which applications are classified into DECs per application source with each DEC associated with an AI model that can have parameters for different applications of the application source.

By dividing the applications of interest into small DECs, an AI model for each class can be implemented that is reduced in complexity with respect to an AI model that addresses multiple classes. For example, DEC(1) 213-1 can be assigned to applications from Google™ dealing only with Google applications. This simplification can reduce both training and inference time, while achieving high accuracy. Existing studies have shown that as the number of applications increases, a single AI model for these applications becomes more complex, training time and inference time also increases, and accuracy becomes lower.

Different DECs may use different AI models. For instance, if there is no ambiguity to identify a given set of applications from an application provider, a conventional random forest (RF) algorithm, which is a supervised learning algorithm can be used for both classification and regression analysis, can well address these type of applications. In other cases, in which applications from an application provider use the same CDN servers with the same uniform resource locator (URL), traditional AI models may not be suitable for this type of applications. Research has shown that long short-term memory (LSTM) networks, which are a type of recurrent neural network (RNN) composed of LSTM units, or one dimensional (1D) convolutional neural network (CNN), may be more suitable techniques. In addition, with increased encrypted traffic, traditional AI models may not meet the challenges provided by encryption. Traditional AI models can include RF, SAE (Stacked AutoEncoder), ensemble learning techniques, etc. LSTM and 1D CNN can detect sequential data very well and, based on initial inventor studies, these techniques are more suitable to perform encrypted traffic analysis than other techniques. However, LSTM and 1D CNN may not perform well when the number of applications increases. A hierarchical approach, as taught herein, can be implemented to narrow down the number of applications that each model handles. The first level of the hierarchical approach can be directed to application category classification and the second level can use an AI technique to classify an individual application under a given category. The AI technique can be LSTM, 1D CNN, or other AI technique. Algorithms for the first level can include using regular expression techniques, policy based techniques, even certain simple machine learning algorithms.

A number of different types of AI, which can include machine learning (ML) procedures, can be realized in the creation of the AI models 115-1, 115-2, 115-3 ... 115-N of AI models set 114 of architecture 100 FIG. 1. A workflow procedure for the architecture 100 can include data flow from UPFS 120-0, 120-1, 120-2 ... 120-M for AI models 115-1, 115-2, 115-3 ... 115-N in cloud 105 and from AI models 115-1, 115-2, 115-3 ... 115-N in cloud 105 for UPFs 120-0, 120-1, 120-2 ... 120-M. The multiple UPFs 120-0, 120-1, 120-2 ... 120-M can feed, on a continuing basis, relevant real time application data to corresponding training AI models 115-1, 115-2, 115-3 ... 115-N in the cloud. The continuing basis for the feed may be a continuous feed, a periodic feed, a polled feed, or the feed can be provided in some other form of a recurring manner. In order to realize such capability, a module inside each UPF can be constructed to dispatch flows according to DECs. A module, herein, is a number of distinct but interrelated software units in a memory storage component from which a program can be constructed or into which an activity, which may be complex, can be analyzed. The module typically includes instructions executed by one or more processors in communication with the memory storage and may include hardware associated with the interrelated software units.

With AI models capable of being trained on an on-going basis, AI models 115-1, 115-2, 115-3 ... 115-N of AI models set 114 are also AI training models 115-1, 115-2, 115-3 ... 115-N. Multiple models of the AI models 115-1, 115-2, 115-3 ... 115-N can run in parallel to leverage the multiple core CPU architecture of cloud 105 to handle multiple DECs. AI training models 115-1, 115-2, 115-3 ... 115-N can generate IF models, using the relevant real time application data from UPFs 120-0, 120-1, 120-2 ... 120-M. The IF models are deployed at UPFs 120-0, 120-1, 120-2 ... 120-M. With the relevant real time application data being fed to the AI training models 115-1, 115-2, 115-3 ... 115-N on a continuing basis, AI training models 115-1, 115-2, 115-3 ... 115-N can keep updating IF models based on the traffic updates. If the IF models, as outputs of corresponding AI models, get updated by the AI training models 115-1, 115-2, 115-3 ... 115-N, the updated IF models can be pushed from cloud 105 to UPFs 120-0, 120-1, 120-2 ... 120-M. In various embodiments, a UPF of the UPFs 120-0, 120-1, 120-2 ... 120-M can have a different relationship with AI models set than the other UPFs. This independent relationship for the UPF can include the number of IF models, which are generated from AI models set 114, disposed and updated in the UPF, being different from the number of IFs disposed and updated in the other UPFs of UPFs 120-0, 120-1, 120-2 ... 120-M. In other embodiments, each UPF of the UPFs 120-0, 120-1, 120-2 ... 120-M can receive the same set of IF models originating from AI models set 114.

Figure 3:
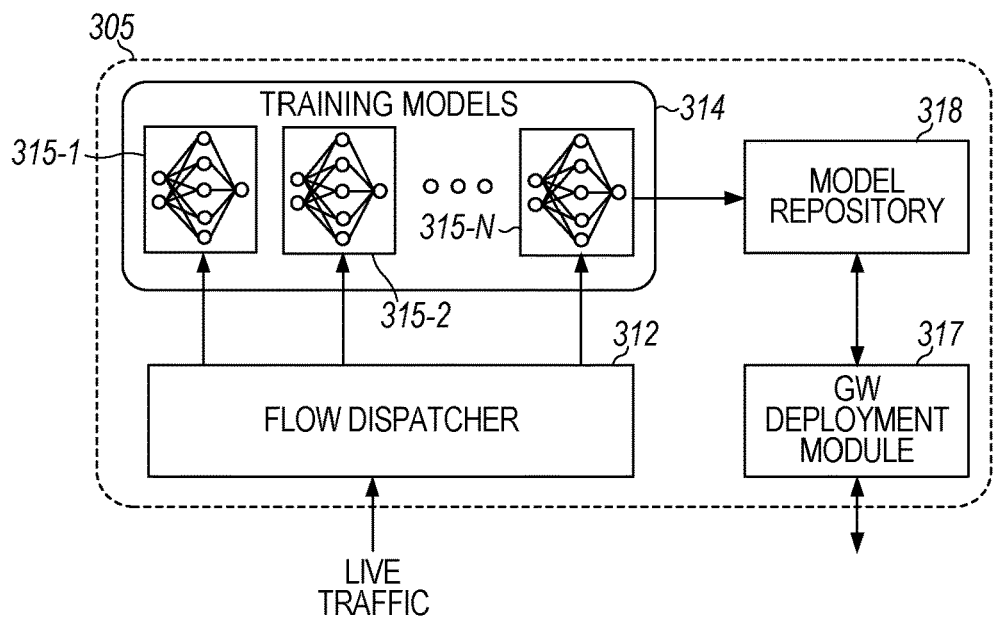
FIG. 3 is a representation of an example implementation of cloud based or centralized artificial intelligence models for a services awareness engine, according to an example embodiment.

FIG. 3 is a representation of an embodiment of an example implementation of cloud based or centralized AI models for a SA engine. An AI models set 314 of AI training models 315-1, 315-2 ... 315-N can be disposed in a cloud 305. AI models set 314 disposed in cloud 305 can be realized by, or be identical or similar, to AI models set 114 disposed in cloud 105 of FIG. 1. In addition to AI models set 314, cloud 305 can include a flow dispatcher 312, a model repository 318, and GW deployment module 317.

Flow dispatcher 312 can be a DEC driven flow dispatcher and can be realized as a module in cloud 305. Upon receiving live traffic, flow dispatcher module 312 can obtain the DEC information from the received live traffic. The obtainment can include parsing the received live traffic using one or more of a number of common parsing techniques. Machine learning techniques can be used to deduce the application category of the DEC information. Based on the obtainment of the DEC information, flow dispatcher module 312 can feed the incoming live traffic to the proper AI training models. The proper AI training models to receive the incoming live traffic are those correlated to the DEC identified in the DEC information. For example, for a group of packets received, some packets may include information identifying a DEC tied to applications of one source and other packets may include information identifying a DEC tied to applications of another source.

Each AI training model 315-1, 315-2 ... 315-N of AI models set 314 receives a portion of the received data traffic to cloud 305 as an individual feed from flow dispatcher 312 based on results from the obtainment of the DEC information by flow dispatcher 312. Each portion is associated with an AI model of AI models set 314 corresponding to the DEC discovered in the obtainment of the DEC information from the live traffic. Each AI model of AI models set 314, when receiving input from flow dispatcher 312, can derive an IF model corresponding to the DEC associated with the AI model. The IF model is a model to recognize a service and a specific application of the service and to process the specific application. The derivation of the IF model by an AI model of AI models set 314 can be based on historic data for the DEC associated with the AI model and live traffic associated with this DEC. Each AI training model of the AI training models 315-1, 315-2 . . . 315-N derives the corresponding IF model, given the associated DEC.

The outputs of AI training models 315-1, 315-2 . . . 315-N can be saved into model repository (MR) 318. The outputs of AI training models 315-1, 315-2 . . . 315-N are to be used as IF models for one or more UPFs. MR 318 can be structured to perform a number of functions. With the AI training models 315-1, 315-2 . . . 315-N receiving live traffic related to the DECs associated with AI training models 315-1, 315-2 . . . 315-N, the AI training models 315-1, 315-2 . . . 315-N use the newly received live traffic and historic data to generate new outputs to update IF models. When the AI training models 315-1, 315-2 . . . 315-N are updated, resulting in updated IF models, MR 318 can trigger deployment of the updates to the IF models to the UPFs corresponding to the IF models or updated IF models to the UPFs corresponding to the IF models. When a new UPF joins the network serviced by cloud 305, IF models can be pulled from MR 318 for the new UPF. The pulled IF models can be the most updated IF models. In various embodiments, MR 318 can maintain a number of versions of AI training models 315-1, 315-2 . . . 315-N over a period to provide historic data.

GW deployment module 317 can interact with MR 310 to handle deployment of one or more IF models, stored in MR 310, to one or more UPFs. GW deployment module 317 can deploy the one or more IF models to UPFs on a per UPF basis. When a UPF is deployed in the field defined by a network operable with cloud 305, information about this newly deployed UPF can be served as an input for this GW deployment module 317. The information provided can include information on the manner in which communication of IF modules are to be communicated to the deployed UPF. GW deployment module 317 can push the one or more latest IF model updates to the UPFs.

Figure 4:
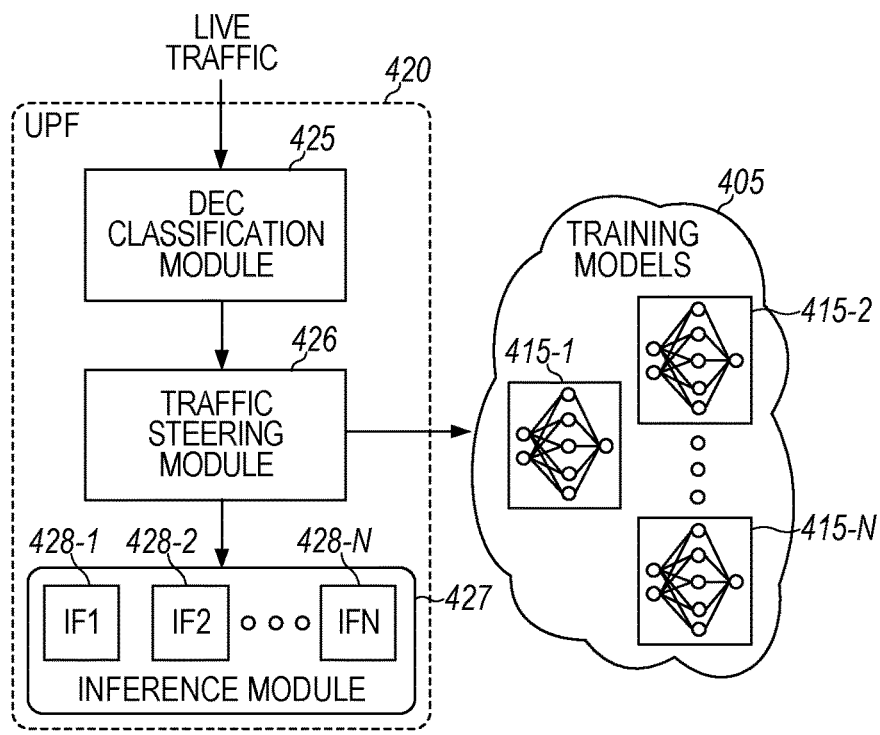
FIG. 4 is an example user plane function gateway that can operate with a cloud in which artificial intelligence models are disposed, according to an example embodiment.

FIG. 4 is an embodiment of an example UPF gateway 420 that can operate with a cloud 405 in which AI models 415-1, 415-2 . . . 415-N are disposed. AI training models 415-1, 415-2 . . . 415-N can be disposed in a cloud 405 and can be realized by or be identical or similar to AI training models 115-1, 115-2 . . . 115-N disposed in cloud 105 of FIG. 1. UPF 420 or a UPF identical or similar to UPF 420 can be implemented as one or more of UPFs 120-0, 120-1, 120-2 . . . 120-M of FIG. 1. UPF 420 can include a DEC classification (DECC) module 425, a traffic steering module 426, and an IF model 427.

DECC module 425 provides a mechanism to classify flows of interest into DECs based on the information provided by a policy. Herein, a policy includes a specification of the type of applications to be classified. For example, if applications from an application source, such as for example Google, are of interest, DECC module 425 can classify flows into a Google application group that defines a DEC. DECC module 425 can perform the classification based on domain name system (DNS) messages via regular expression checkup. DNS is a hierarchical decentralized naming system for computers, services, or other resources connected to the Internet or a private network, where the DNS associates various information with domain names assigned to each of the participating entities. A regular expression can be entered as part of a command and can be a pattern made up of symbols, letters, and numbers that represent an input string for matching. Matching the string to a specified pattern is called pattern matching. To recognize a DEC for classification, pattern recognition or machine learning may also be applied.

Based on the outcome of DEC classification by DECC module 425, traffic steering module 426 can selectively send flows of interest to AI training modules 415-1, 415-2 . . . 415-N in cloud 405 or to a centralized location and to IF module 427 in UPF 420. The traffic steering can be DEC driven. In traffic sent for use by AI training modules 415-1, 415-2 . . . 415-N, DEC information can be added to the traffic being sent. In traffic sent for interference module 427, the traffic can be divided according to the DECs recognized in the operation of DECC module 425. To reduce overhead in the traffic sent for use by AI training modules 415-1, 415-2 . . . 415-N, only part of the flows of interest is sent to training modules 415-1, 415-2 . . . 415-N. For the flows of interest sent to IF module 427, the DEC information associated with each flow of interest is also sent along with the flow of interest to IF module 427 for use by local IF models 428-1, 428-2 . . . 428-N. The number of IF models in UPF 420 can equal the number of AI models in cloud 405. In some UPFs, the number of IF models can be less than the number of AI models in cloud 405. In some UPFs associated with another set of AI models, the number of IF models can be greater than the number of AI models in cloud 405, where the excess IF models may be for a different source.

IF module 427 can dispatch incoming flows from traffic steering module 426 into corresponding ones of IF models 428-1, 428-2 . . . 428-N. In addition, IF module 427 can manage the IF models 428-1, 428-2 . . . 428-N. Upon receiving an update for a particular IF model from cloud 405, IF module 427 can update the particular IF model. The update can be received as an update to portions of the particular IF model or as a new version of the particular IF model. IF module 427 can be involved, in addition to the update of an IF model in UPF 420, in one or more of creation of an IF model in UPF 420 and deletion of an IF model from UPF.

Figure 5:
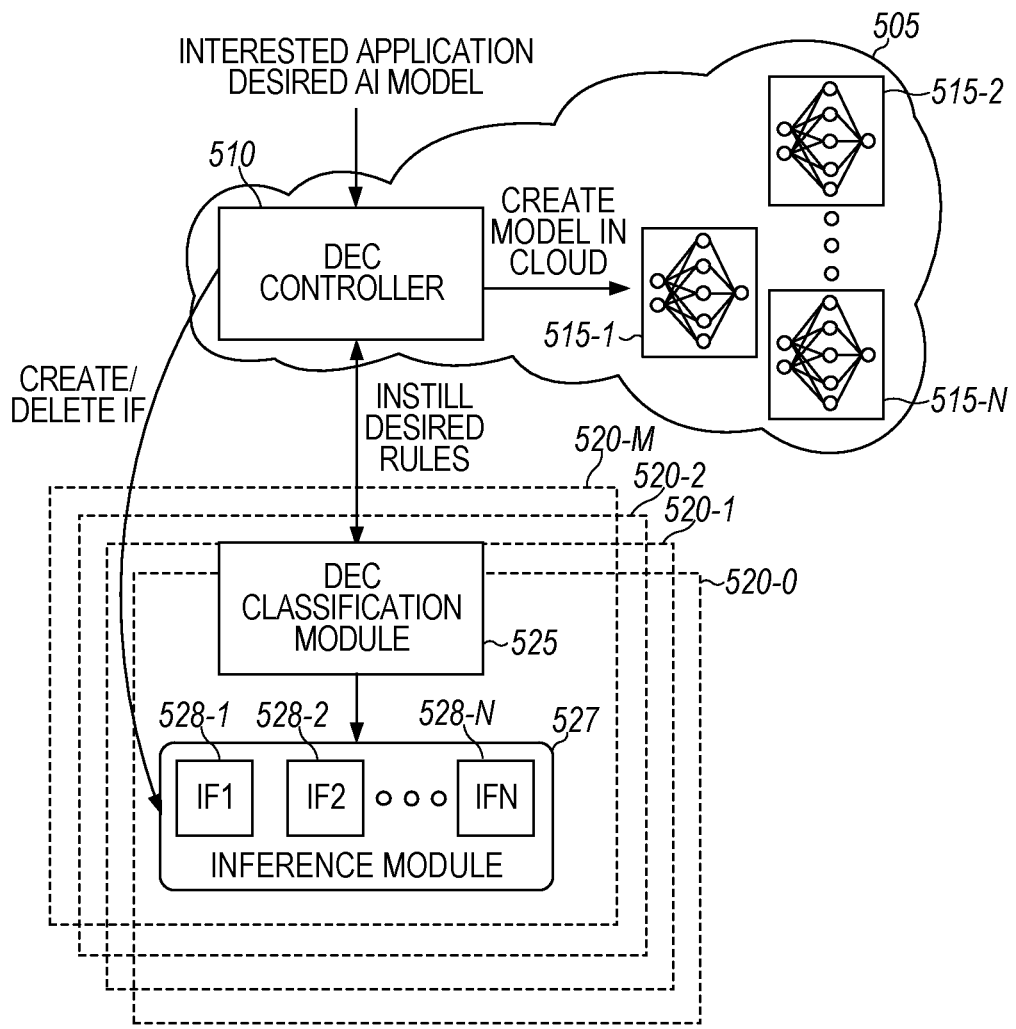
FIG. 5 is an illustration of an example decode equivalent class controller that interacts with artificial intelligence models and interacts with a number of user plane function gateways, according to an example embodiment.

FIG. 5 is an illustration of an embodiment of an example DEC controller 510 that interacts with AI models 515-1 . . . 515-N and interacts with a number of UPFs 520-0, 520-1, 520-2 . . . 520-M. DEC controller 510 can reside in a cloud 505 or centralized location. AI models 515-1 . . . 515-N can be disposed in a cloud 505 and can be realized by or be identical or similar to one of AI training models 115-1, 115-2 . . . 115-N disposed in cloud 105 of FIG. 1, AI training models 315-1, 315-2 . . . 315-N disposed in cloud 305 of FIG. 3, and AI training models 415-1, 415-2 . . . 415-N disposed in cloud 405 of FIG. 4. UPFs 520-0, 520-1, 520-2 . . . 520-M can be implemented to be identical or similar to UPF 420 of FIG. 4 and can be realized by or be identical or similar to UPFs 120-0, 120-1, 120-2 . . . 120-M of FIG. 1. DEC controller 510 can be implemented in cloud 505.

DEC controller 510 can manage multiple UPFs 520-0, 520-1, 520-2 . . . 520-M and multiple AI models 515-1 . . . 515-N. Each UPF of multiple UPFs 520-0, 520-1, 520-2 . . . 520-M can include a DEC classification module 525 that classifies input traffic based on recognized DECs and provides the input traffic along with DEC information for IF models 528-1, 528-2 . . . 528-N in an IF module 527. DEC classification module 525, IF models 528-1, 528-2 . . . 528-N, and IF module 527 can be implemented to be identical or similar to DEC classification module 425, IF models 428-1, 428-2 . . . 428-N, and IF module 427 of FIG. 4.

DEC controller 510 can acquire inputs regarding an application of interest and a desired AI model for the application of interest. Parameters for the desired AI model can be included in the inputs regarding the AI model. The information may be provided by a user interface associated with the instruments of cloud 505. With this information, DEC controller 510 can create an AI module in cloud 505, where the created AI model corresponds to the application of interest. For example, AI models 515-1 . . . 515-N can have been created by DEC controller 510. Upon creation, an AI model is a training AI model, and, after a threshold amount of training, the training AI model becomes an operational/inference AI model. However, data can be provided to the operational AI model that can be used to further train the operational AI model such that the operational model is also a training AI model. The training AI models 515-1 . . . 515-N provide outputs that are used as the IF models 428-1, 428-2 . . . 428-N in one or more of the UPFs 520-0, 520-1, 520-2 . . . 520-M.

DEC controller 510 can manage UPFs 520-0, 520-1, 520-2 . . . 520-M with respect to application recognition by installing information regarding each application to be recognized and the associated DEC to which such application is mapped. This information can include desired rules for each application having an associated DEC. DEC controller 510 can provide the information directed to DEC classification module 525 for installation in DEC classification module 525 at the UPF regarding the DECs corresponding to the UPF. The rules instilled by DEC controller 510 into DEC classification module 525 can be on a per application category basis and/or a per UPF basis. DEC controller 510 can also operate in creation of IFs in IF module 527 and in deletion of IFs in IF module 527, for example, by controlling such operations.

The structures discussed in each of the FIGS. 1-5 may be implemented with features of the corresponding structures in the other Figures, as taught herein. In addition, separate modules in the UPFs, as discussed herein, may be integrated into a single module in the UPFs and separate modules in the clouds, as discussed herein, may be integrated into a single module in the cloud. For example, flow dispatcher 312 of FIG. 3 may be integrated with a DEC controller 110 of FIG. 1 or DEC controller 510 of FIG. 5 into a single module. GW deployment module 317 may be integrated into MR 318. DEC classification module 425 and traffic steering module 426 may be integrated into a single module. One or both of DEC classification module 425 and traffic steering module 426 may be integrated with IF module 427 into a single module.

Figure 6:
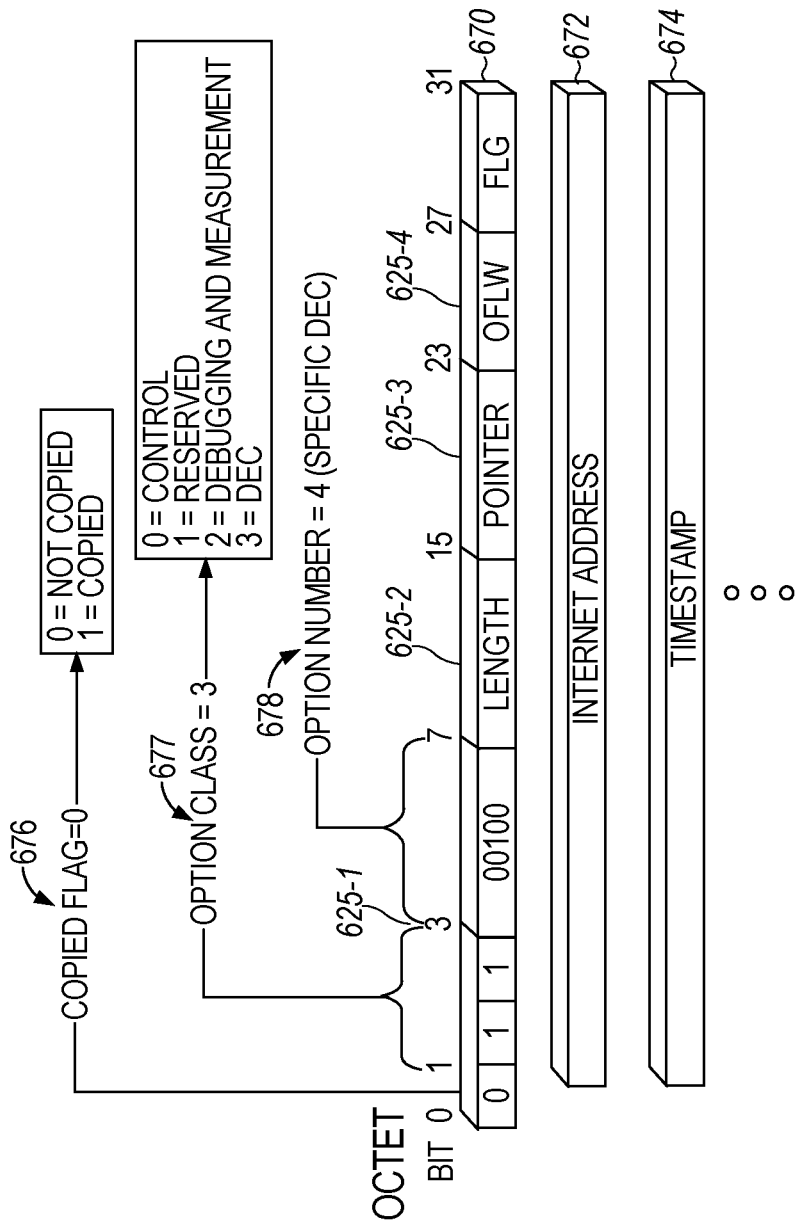
FIG. 6 illustrates an example approach to carry a decode equivalent class identification from a packet header, according to an example embodiment.

As discussed with respect to FIGS. 1 and 4, DEC information can be shared among traffic steering module 426, IF module 427, clouds 105 and 405. The DEC information can be carried with the traffic flows. FIG. 6 illustrates an approach to carry a DEC identification from a packet header. The packet header may be an optional header with respect to headers currently included in communication packets. DEC information, added into an optional packet header, can be extracted at both a cloud end, such as in clouds 105 of FIG. 1, cloud 305 of FIG. 5, cloud 405 of FIG. 4, and cloud 5 of FIG. 5, and at an IF module such as IF module 427 of FIG. 4 and IF module 527 of FIG. 5.

The header 670 including identification of DEC information can be included in a stack above an internet address 672 and a timestamp 674. Header 670 can be arranged as four octets 675-1, 675-2, 675-3 and 675-4. The eight bits of octet 675-4 can be allocated for an overflow indicator and a flag, depending on the packet. The eight bits of octets 675-3 and 675-2 can be allocated for a pointer and length, respectively. DEC identification can be included within the eight bits of octet 675-1. Bit 0 of octet 675-1 can be used to indicate not copied or copied. Bits 1 and 2 of octet 625-1 can be used to identify one or four possible classes: control, reserved, debugging and measurement, and DEC. With bits 1 and 2 both set to one, which can be taken to be binary for three. The entry of bits 1 and 2 corresponding to three can be used to identify that header 670 is providing DEC information. With entry of bits 1 and 2 corresponding to three, the five bits 3 to 7 in octet 675-1 provide a code identifying a specific DEC. Both the transmitting module of DEC information and the recipient module of the packet with header 670 can include a table or other storage format that maps the five bits 3 to 7 in octet 675-1 to a specific DEC. Other formats or techniques can be used to provide DEC information in a packet.

Other mechanisms may be used to communicate DEC information. Use can be made a characteristic of hypertext transfer protocol (HTTP) protocol. When an object is retrieved using the HTTP protocol, the protocol allows information about the object to be provided when sent. For external communication, support is provided for enabling DEC information in HTTP metadata. Metadata can be used as HTTP optional header for packets belonging to a given DEC. For example, packets belonging to a source of one or more applications can have the name of the source listed in a HTTP optional custom header. For example, an optional custom header for a packet can include DEC ID: source name. Values can be added to a packet to indicate that the packet has certain attributes. A module inside a cloud can be constructed to support such mechanism to read the DEC information for AI training models. The module may be part of a DEC controller such as DEC controller 110 of FIG. 1 or as DEC controller 510 of FIG. 5. Such a module inside a cloud may be part of a flow dispatcher such as flow dispatcher 312 of FIG. 3.

For communications regarding DEC information sharing inside a UPF, internal messaging or optional IP header can be used. The optional IP header can be identical or similar to header 670 of FIG. 6. Other header formats may be used. Other techniques to incorporate DEC information with communication traffic may be implemented.

Figure 7:
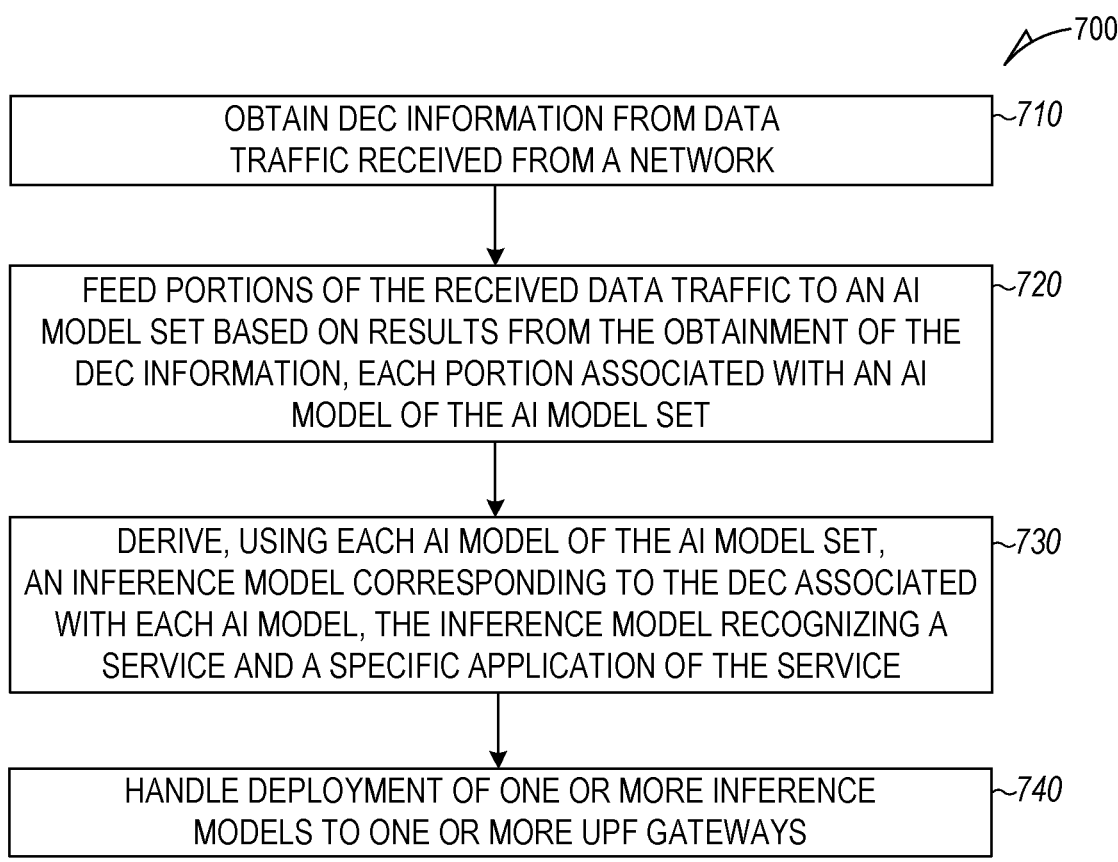
FIG. 7 is a flow diagram of an example method of operating a system to enable recognition of an application in network data flows, according to an example embodiment.

FIG. 7 is a flow diagram of an embodiment of an example method 700 of operating a system to enable recognition of an application in network data flows. Method 700 can be implemented as a computer-implemented method using a memory storage comprising instructions and one or more processors in communication with the memory storage, where the one or more processors execute instructions of the memory storage. At operation 710, DEC information from data traffic received from a network is obtained. A DEC corresponds to a class of traffic that is mapped to an AI model associated with parameters related to the class of traffic. The obtainment can include parsing the received data traffic using one or more of a number of common parsing techniques. Obtainment of the DEC information can include reading a packet header to extract the DEC information, reading a packet having the DEC listed in a HTTP custom header, or using machine learning to deduce the DEC information.

At operation 720, portions of the received data traffic are fed to an AI model set based on results from the obtainment of the DEC information, where each portion is associated with an AI model of the AI model set. At operation 730, using each AI model of the AI model set, an IF model corresponding to the DEC associated with each AI model is derived, where the IF model recognizes a service and a specific application of the service. Each IF model derived by its corresponding AI model can be saved to a model repository. At 740, deployment of one or more IF models to one or more UPF gateways is handled.

Variations of the method 700 or methods similar to the method 700 can include a number of different embodiments that may be combined depending on the application of such methods and/or the architecture of systems in which such methods are implemented. Such methods can include triggering deployment of an IF model update to the one or more UPF gateways upon generation of the IF model update. Generation of the IF model update can be performed by a corresponding AI model. Variations can include receiving UPF gateway information from a newly added UPF gateway. The UPF gateway information can include information regarding the manner in which communications can be made with the UPF gateway.

Variations of the method 700 or methods similar to the method 700 can include performing operations as a DEC controller to manage multiple UPF gateways and the AI model set. Performing the operations as the DEC controller can include: acquiring inputs on an application of interest and inputs for an AI model associated with the application of interest; creating the AI model in the system corresponding to parameters associated with the application of interest for inclusion in the AI model set; and installing rules at the one or more UPF gateways to include the application of interest for DEC classification at the one or more UPF gateways. Performing the operations as the DEC controller can include creating or deleting IF models in a UPF gateway.

Figure 8:
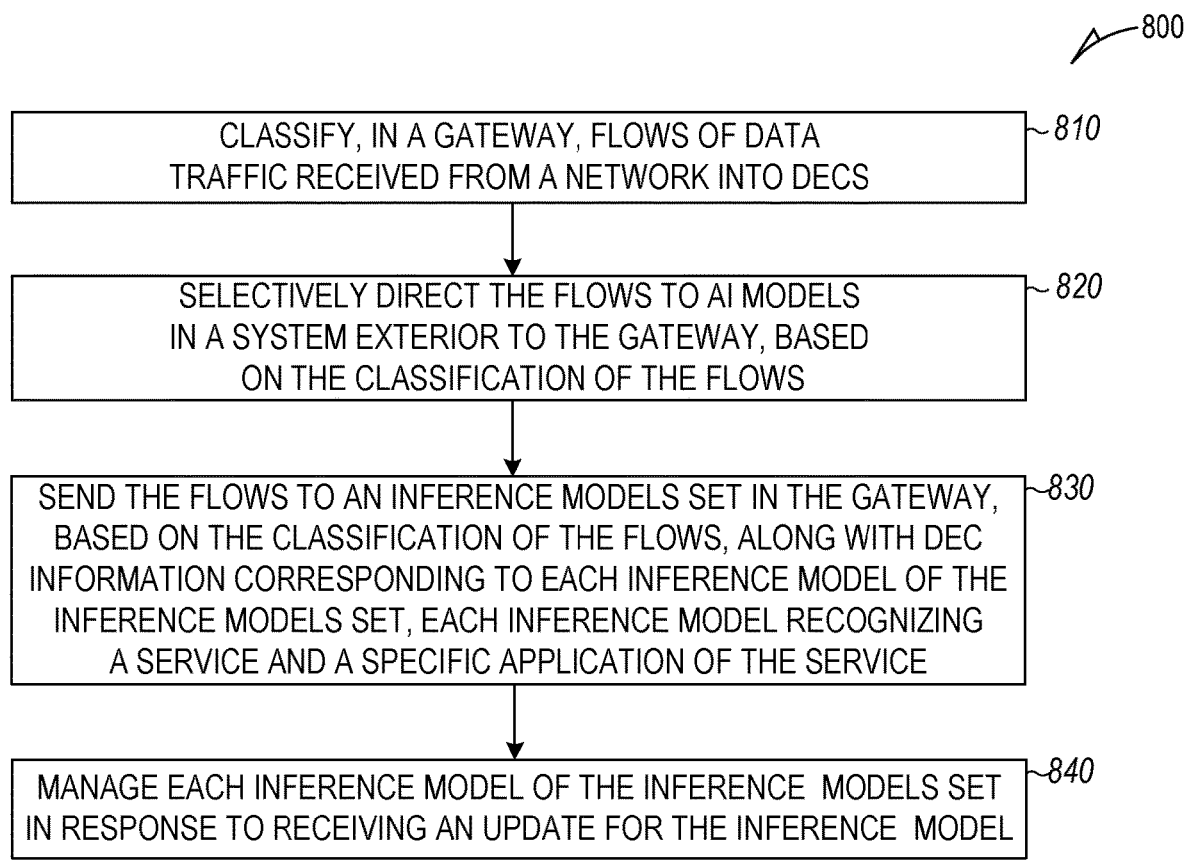
FIG. 8 is a flow diagram of an example method of operating a gateway enabled to recognize an application in network data flows, according to an example embodiment.

FIG. 8 is a flow diagram of an embodiment of an example method 800 of operating a gateway enabled to recognize an application in network data flows. Method 800 can be implemented as a computer-implemented method using a memory storage comprising instructions and one or more processors in communication with the memory storage, where the one or more processors execute instructions of the memory storage. At operation 810, flows of data traffic received from a network are classified in a gateway into DECs. As previously noted, a DEC corresponds to a class of traffic that is mapped to an AI model associated with parameters related to the class of traffic. The classification of the flows of data traffic can be based on information in a stored policy that specifies types of applications to classify. In one option for application category classification, the flows of data can be classified into DECs based on domain name system messages via regular expression checkup. Other mechanisms for application category classification can be implemented.

At 820, the flows are selectively directed to AI models in a system exterior to the gateway, based on the classification of the flows. The flows to the AI models can include a packet header for an individual flow having DEC information associated with the individual flow or a hypertext transfer protocol (HTTP) custom header for an individual flow having the DEC corresponding to the individual flow. Selectively directing the flows to the AI models can include only sending a part of the flows to the AI models.

At 830, the flows are sent to an IF models set in the gateway, based on the classification of the flows, along with DEC information corresponding to each IF model of the IF models set, with each IF model recognizing a service and a specific application of the service. At 840, each IF model of the IF models set is managed in response to receiving an update for each IF model.

In various embodiments, a non-transitory machine-readable storage device, such as computer-readable non-transitory media, can comprise instructions stored thereon, which, when executed by components of a machine, cause the machine to perform operations, where the operations comprise one or more features similar to or identical to features of methods and techniques described with respect to method 700, method 800, variations thereof, and/or features of other methods taught herein such as associated with FIGS. 1-6. The physical structures of such instructions may be operated on by one or more processors. For example, executing these physical structures can cause the machine to perform operations comprising: obtaining, with the one or more processors, DEC information from data traffic received from a network, wherein a DEC corresponds to a class of traffic that is mapped to an AI model associated with parameters related to the class of traffic; feeding, with the one or more processors, portions of the received data traffic to an AI model set based on results from the obtainment of the DEC information, each portion associated with an AI model of the AI model set; deriving, using each AI model of the AI model set, an IF model corresponding to the DEC associated with each AI model, the IF model recognizing a service and a specific application of the service; and handling, with the one or more processors, deployment of one or more IF models to one or more UPF gateways.

In another example, executing physical structures of a non-transitory machine-readable storage device of another machine, using one or more processors of the other machine, can cause this machine to perform operations comprising: classifying, in a gateway, flows of data traffic received from a network into DECs, wherein a DEC corresponds to a class of traffic that is mapped to an AI model associated with parameters related to the class of traffic; selectively direct the flows to AI models in a system exterior to the gateway, based on the classification of the flows; send the flows to an IF models set in the gateway, based on the classification of the flows, along with DEC information corresponding to each IF model of the IF models set, each IF model recognizing a service and a specific application of the service; and managing each IF model of the IF models set in response to receiving an update for each IF model.

Figure 9:
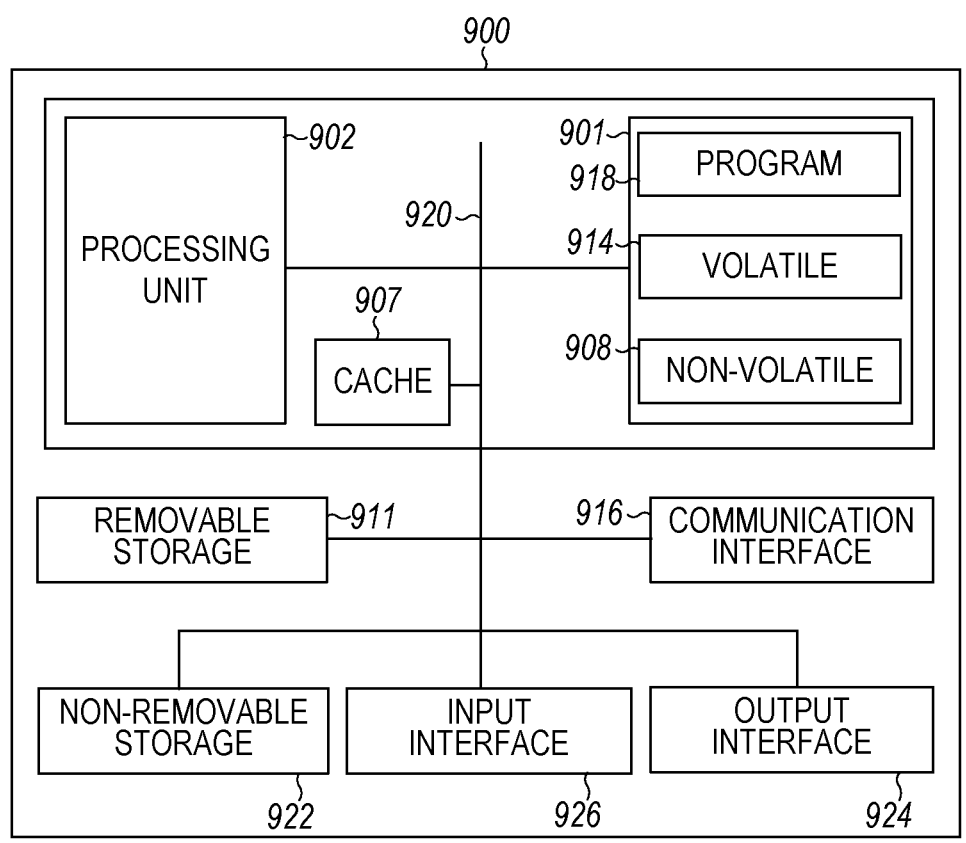
FIG. 9 is a block diagram illustrating circuitry for devices for implementing algorithms and performing methods of providing artificial intelligence based hierarchical service awareness, according to an example embodiment.

FIG. 9 is a block diagram illustrating circuitry for devices for implementing algorithms and performing methods of providing AI based hierarchical service awareness, according to the teachings herein. FIG. 9 depicts a device 900 having a non-transitory memory storage 901 storing instructions, a cache 907, and a processing unit 902, coupled to a bus 920. Processing unit 902 can include one or more processors operatively in communication with non-transitory memory storage 901 and cache 907. The one or more processors can be structured to execute the instructions to operate device 900 according to any of the methods taught herein. Device 900 may be structured in a cloud operable with one or more UPFs associated with one or more networks to enable application recognition in the one or more UPFs for service awareness. Device 900 may be structured in a UPF to provide application recognition for service awareness in conjunction with a cloud.

In cloud instrumentation, the one or more processors can be structured to execute instructions to: obtain DEC information from data traffic received from a network, wherein a DEC corresponds to a class of traffic that is mapped to an AI model associated with parameters related to the class of traffic; feed portions of the received data traffic to an AI model set based on results from the obtainment of the DEC information, each portion associated with an AI model of the AI model set; derive, using each AI model of the AI model set, an IF model corresponding to the DEC associated with each AI model, the IF model recognizing a service and a specific application of the service; and handle deployment of one or more IF models to one or more UPF gateways. The one or more processors in the cloud instrumentation can execute other cloud based functions, as taught herein.

In a UPF, the one or more processors can be structured to execute instructions to: classify flows of data traffic received from a network into decode equivalent class (DECs), wherein a DEC corresponds to a class of traffic that is mapped to an artificial intelligence (AI) model associated with parameters related to the class of traffic; selectively direct the flows to AI models in a system exterior to the gateway, based on the classification of the flows; send the flows to an inference models set in the gateway, based on the classification of the flows, along with DEC information corresponding to each inference model of the inference models set, each inference model recognizing a service and a specific application of the service; and manage each inference model of the inference models set in response to receiving an update for each inference model. The one or more processors in the UPF can execute other UPF based functions, as taught herein.

Device 900 can include a communication interface 916 operable to communicate among devices and systems associated with a cloud to which device 900 is associated. The communication interface 916 may be part of a data bus that can be used to receive the data traffic for processing.

Non-transitory memory storage 901 may be realized as machine-readable media, such as computer-readable media, and may include volatile memory 914 or non-volatile memory 908. Device 900 may include or have access to a computing environment that includes a variety of machine-readable media including as computer-readable media, such as volatile memory 914, non-volatile memory 908, removable storage 911, or non-removable storage 922. Such machine-readable media may be used with instructions in one or more programs 918 executed by device 900. Cache 907 may be realized as a separate memory component or part of one or more of volatile memory 914, non-volatile memory 908, removable storage 911, or non-removable storage 922. Memory storage can include random access memory (RAM), read only memory (ROM), erasable programmable read-only memory (EPROM), electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Device 900 may include or have access to a computing environment that includes input interface 926 and output interface 924. Output interface 924 may include a display device, such as a touchscreen, that also may serve as an input device. Input interface 926 may include one or more of a touchscreen, touchpad, mouse, keyboard, camera, one or more device-specific buttons, one or more sensors integrated within or coupled via wired or wireless data connections to device 900, and other input devices.

Device 900 may operate in a networked environment using a communication connection to connect to one or more other devices that are remote. Such remote devices may be identical or similar to device 900 or may be different types of devices having features similar or identical to features of device 900 or other features, as taught herein, to handle service awareness processing. The remote devices may include computers, such as database servers. Such remote computers may include a personal computer (PC), server, router, network PC, a peer device or other common network node, or the like. The communication connection may include a Local Area Network (LAN), a Wide Area Network (WAN), cellular, WiFi, Bluetooth, or other networks.

Machine-readable instructions, such as computer-readable instructions stored on a computer-readable medium, are executable by the processing unit 902 of the device 900. A hard drive, CD-ROM, and RAM are some examples of articles including a non-transitory computer-readable medium such as a storage device. The terms machine-readable medium, computer-readable medium, and storage device do not include carrier waves to the extent carrier waves are deemed transitory. Storage can also include networked storage such as a storage area network (SAN).

Device 900 can be realized as a computing device that may be in different forms in different embodiments, as part of a network such as a SDN/IoT network. For example, device 900 may be a smartphone, a tablet, smartwatch, other computing device, or other types of devices having wireless communication capabilities, where such devices include components to engage in the distribution and storage of items of content, as taught herein. Devices, such as smartphones, tablets, smartwatches, and other types of device having wireless communication capabilities, are generally collectively referred to as mobile devices or user equipment. In addition, some of these devices may be considered as systems for the functions and/or applications for which they are implemented. Further, although the various data storage elements are illustrated as part of the device 900, the storage may also or alternatively include cloud-based storage accessible via a network, such as the Internet or server based storage.

Further, machine-readable storage devices, such as computer-readable non-transitory media, herein, are physical devices that stores data represented by physical structure within the respective device. Such a physical device is a non-transitory device. Examples of machine-readable storage devices can include, but are not limited to, read only memory (ROM), random access memory (RAM), a magnetic disk storage device, an optical storage device, a flash memory, or other electronic, magnetic, and/or optical memory devices. The machine-readable device may be a machine-readable medium such as memory 901 of FIG. 9. Terms such as "memory," "memory module," "machine-readable medium," "machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory," "memory module," "machine-readable medium," and "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

In various embodiments, a system can be implemented to enable application recognition in data traffic for service awareness. Such a system can comprise a memory storage comprising instructions and one or more processors in communication with the memory storage. The one or more processors can execute the instructions to: obtain DEC information from data traffic received from a network, wherein a DEC corresponds to a class of traffic that is mapped to an AI model associated with parameters related to the class of traffic; feed portions of the received data traffic to an AI model set based on results from the obtainment of the DEC information, each portion associated with an AI model of the AI model set; derive, using each AI model of the AI model set, an IF model corresponding to the DEC associated with each AI model, the IF model recognizing a service and a specific application of the service; and handle deployment of one or more IF models to one or more UPF gateways.

Variations of such a system or similar systems can include a number of different embodiments that may be combined depending on the application of such systems and/or the architecture in which such systems are implemented. Such systems can include the one or more processors configured to execute instructions to trigger deployment of an IF model update to the one or more UPF gateways upon generation of the If model updates. The one or more processors can execute instructions to receive UPF gateway information from a newly added UPF gateway. The received UPF gateway information can include communication manner information for the newly added UPF gateway.

Variations of such a system or similar systems can include instructions that are executable by the one or more processors to perform operations as a DEC controller, managing multiple UPF gateways and the AI model set. The operations as a DEC controller can include operations to: acquire inputs on an application of interest and inputs for an AI model associated with the application of interest; create the AI model in the system corresponding to parameters associated with the application of interest for inclusion in the AI model set; and install rules at the one or more UPF gateways to include the application of interest for DEC classification at the one or more UPF gateways. The operations as a DEC controller can include operations to create or delete IF models in a UPF gateway.

Variations of such a system or similar systems can include the obtainment of the DEC information performed by parsing received data traffic using one or more of a number of common parsing techniques. The obtainment of the DEC information can be performed by reading a packet header to extract the DEC information. Other obtainment techniques can include using machine learning to deduce the DEC information or reading a packet having the DEC listed in a hypertext transfer protocol (HTTP) custom header.

In various embodiments, a UPF can be implemented for application recognition in data traffic for service awareness. Such a UPF can comprise a memory storage comprising instructions, and one or more processors in communication with the memory storage. The one or more processors can execute the instructions to: classify flows of data traffic received from a network into DECs, wherein a DEC corresponds to a class of traffic that is mapped to an AI model associated with parameters related to the class of traffic; selectively direct the flows to AI models in a system exterior to the gateway, based on the classification of the flows; send the flows to an IF models set in the gateway, based on the classification of the flows, along with DEC information corresponding to each IF model of the IF models set, each IF model recognizing a service and a specific application of the service; and manage each IF model of the IF models set in response to receiving an update for the IF model.

Variations of such a UPF or similar UPFs can include a number of different embodiments that may be combined depending on the application of such UPFs and/or the architecture in which such UPFs are implemented. Such UPFs can include the one or more processors configured to classify the flows of data traffic based on information in a stored policy that specifies types of applications to classify. Such UPFs can include the one or more processors configured to classify flows of data into DECs based on domain name system messages via regular expression checkup. Such UPFs can include the one or more processors can be configured to selectively direct the flows to the AI models by sending a part of the flows to the AI models. Such UPFs can include the flows to the AI models to include a packet header for an individual flow having DEC information associated with the individual flow or a hypertext transfer protocol (HTTP) custom header for an individual flow having the DEC corresponding to the individual flow.

Devices, systems, and methods implemented using an AI based hierarchical SA engine, as taught herein, can provide real time recognition of an application in a network. This implementation can provide for deployment of SA in the network. Such a network can be a mobile core network. Even with the increasing number of mobile applications being supported in the network, this implementation may achieve real time recognition with high accuracy.

In a hierarchical SA engine, DECs that correspond to AI models and parameters can be used recognize applications. Results from using DECs in gateways in a network can be used to further train the AI models, which AI models, in turn, provide IF models to the gateways in the network. The gateways can use the IF models to recognize an application in flows of communication traffic, allowing operators at the gateways a mechanism to apply a service treatment to the communication flow associated with the recognized application. The gateways can be deployed in the network in a distributed manner. The gateways can be UPF gateways in mobile networks. The structure for an SA engine, as taught herein, can allow for the timely updates of IF models at gateways, enhancing the real time recognition of specific applications in communication traffic flows.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A system, comprising:
a memory storage comprising instructions; and
one or more processors in communication with the memory storage, wherein the one or more processors execute the instructions to:
obtain decode equivalent class (DEC) information from data traffic received from a network;
feed portions of the received data traffic to an artificial intelligence (AI) model set based on results from the obtainment of the DEC information, each portion associated with an AI model of the AI model set;

derive, using each AI model of the AI model set, an inference model corresponding to the DEC associated with each AI model, the inference model recognizing a service and a specific application of the service; and handle deployment of one or more inference models to one or more user plane function (UPF) gateways.

2. The system of claim 1, wherein the one or more processors execute instructions to trigger deployment of an inference model update to the one or more UPF gateways upon generation of the inference model updates.

3. The system of claim 1, wherein the one or more processors execute instructions to receive UPF gateway information from a newly added UPF gateway.

4. The system of claim 3, wherein the received UPF gateway information includes communication manner information for the newly added UPF gateway.

5. The system of claim 1, wherein the instructions are executable by the one or more processors to perform operations as a DEC controller, managing multiple UPF gateways and the AI model set.

6. The system of claim 5, wherein the operations as a DEC controller include operations to:

acquire inputs on an application of interest and inputs for an AI model associated with the application of interest;

create the AI model in the system corresponding to parameters associated with the application of interest for inclusion in the AI model set; and install rules at the one or more UPF gateways to include the application of interest for DEC classification at the one or more UPF gateways.

7. The system of claim 5, wherein the operations as a DEC controller include operations to create or delete inference models in a UPF gateway.

8. The system of claim 1, wherein the obtainment of the DEC information includes reading a packet header to extract the DEC information or using machine learning to deduce the DEC information.

9. The system of claim 1, wherein the obtainment of the DEC information includes reading a packet having the DEC listed in a hypertext transfer protocol (HTTP) custom header.

10. A gateway, comprising:

a memory storage comprising instructions; and one or more processors in communication with the memory storage, wherein the one or more processors execute the instructions to:

classify flows of data traffic received from a network into decode equivalent class (DECs);

selectively direct the flows to artificial intelligence (AI) models in a system exterior to the gateway, based on the classification of the flows;

send the flows to an inference models set in the gateway, based on the classification of the flows, along with DEC information corresponding to each inference model of the inference models set, each inference model recognizing a service and a specific application of the service; and manage each inference model of the inference models set in response to receiving an update for each inference model.

11. The gateway of claim 10, wherein the one or more processors classify the flows of data traffic based on information in a stored policy that specifies types of applications to classify.

12. The gateway of claim 10, wherein the one or more processors classify flows of data into DECs based on domain name system messages via regular expression checkup.

13. The gateway of claim 10, wherein the one or more processors selectively direct the flows to the AI models by sending a part of the flows to the AI models.

14. The gateway of claim 10, wherein the flows to the AI models include a packet header for an individual flow having DEC information associated with the individual flow or a hypertext transfer protocol (HTTP) custom header for an individual flow having the DEC corresponding to the individual flow.

15. A computer-implemented method for operating a system to recognize an application in network data flows, the computer-implemented method comprising:

obtaining, with one or more processors, decode equivalent class (DEC) information from data traffic received from a network;

feeding, with the one or more processors, portions of the received data traffic to an artificial intelligence (AI) model set based on results from the obtainment of the DEC information, each portion associated with an AI model of the AI model set;

deriving, using each AI model of the AI model set, an inference model corresponding to the DEC associated with each AI model, the inference model recognizing a service and a specific application of the service; and handling, with the one or more processors, deployment of one or more inference models to one or more user plane function (UPF) gateways.

16. The computer-implemented method of claim 15, wherein the computer-implemented method includes triggering deployment of an inference model update to the one or more UPF gateways upon generation of the inference model update.

17. The computer-implemented method of claim 15, wherein the computer-implemented method includes receiving UPF gateway information from a newly added UPF gateway.

18. The computer-implemented method of claim 15, wherein the computer-implemented method includes performing operations as a DEC controller to manage multiple UPF gateways and the AI model set.

19. The computer-implemented method of claim 18, wherein performing the operations as the DEC controller includes:

acquiring inputs on an application of interest and inputs for an AI model associated with the application of interest;

creating the AI model in the system corresponding to parameters associated with the application of interest for inclusion in the AI model set; and installing rules at the one or more UPF gateways to include the application of interest for DEC classification at the one or more UPF gateways.

20. The computer-implemented method of claim 18, wherein performing the operations as the DEC controller includes creating or deleting inference models in a UPF gateway.

* * * * *